United States Patent [19]

Scott et al.

[11] Patent Number: 4,767,515

[45] Date of Patent: Aug. 30, 1988

[54] SURFACE AREA GENERATION AND DROPLET SIZE CONTROL IN SOLVENT EXTRACTION SYSTEMS UTILIZING HIGH INTENSITY ELECTRIC FIELDS

[75] Inventors: Timothy C. Scott, Knoxville; Robert M. Wham, Oak Ridge, both of Tenn.

[73] Assignee: The United States of America as represented by the United States Department of Energy, Washington, D.C.

[21] Appl. No.: 79,390

[22] Filed: Jul. 30, 1987

[51] Int. Cl.⁴ .............................................. B03C 5/00
[52] U.S. Cl. ................................................. 204/186
[58] Field of Search ............................ 204/186, 302

[56] References Cited

U.S. PATENT DOCUMENTS 4,204,934 5/1980 Warren .............................. 204/186

OTHER PUBLICATIONS

"The Physical Review, Instability of Electrified Liquid Surfaces", John Zeleny, 2nd Series, vol. X, No. 1, 1917, pp. 1–6.

"Proc. Roy. Soc., Some Investigations on the Deformation and Breaking of Water Drops in Strong Electric Fields"—W. A. Macky, A. vol. 133, Jul. 2, 1981, pp. 565–587.

"Liquid Phase Separation in Pulsed D. C. Fields"—P. J. Bailes and S. K. L. Larkai, vol. 60, 1982, pp. 115–121.

"Separation Science and Technologys Electrical Field Contactor for Solvent Extraction"–L. Martin and P. Vignet, vol. 18, 1984, pp. 1455–1471.

Primary Examiner—T. M. Tufariello
Attorney, Agent, or Firm—Stephen D. Hamel; Judson R. Hightower

[57] ABSTRACT

A method and system for solvent extraction where droplets are shattered by a high intensity electric field. These shattered droplets form a plurality of smaller droplets which have a greater combined surface area than the original droplet. Dispersion, coalescence and phase separation are accomplished in one vessel through the use of the single pulsing high intensity electric field. Electric field conditions are chosen so that simultaneous dispersion and coalescence are taking place in the emulsion formed in the electric field. The electric field creates a large amount of interfacial surface area for solvent extraction when the droplet is disintegrated and is capable of controlling droplet size and thus droplet stability. These operations take place in the presence of a counter current flow of the continuous phase.

8 Claims, 3 Drawing Sheets

SURFACE AREA GENERATION AND DROPLET SIZE CONTROL IN SOLVENT EXTRACTION SYSTEMS UTILIZING HIGH INTENSITY ELECTRIC FIELDS

The U.S. Government has rights in this invention pursuant to Contract No. DE-ACO5-840R21400 between the Department of Energy and Marietta Energy Systems, Inc.

BACKGROUND OF THE INVENTION

The present invention relates to a method and system for solvent extraction. More specifically, the present invention relates to a method and system for disintegrating droplets to form a plurality of much smaller droplets which have a larger combined surface area than the original droplet, which due to the large amounts of interfacial surface area of the plurality of smaller droplets, solvent extraction operations are enhanced.

Many commercial solvent extraction systems are known. These systems are limited by the mass transfer rates of one or more chemical species between a continuous phase and a dispersed phase. Parameters limiting the mass transfer rate include surface area, convection, diffusion through each of the two phases, reaction rate and differences in chemical activity of the species in the two phases. Diffusion and chemical activity are defined by the system in use. The reaction rate is chemical in nature and convection and surface area are physical problems.

Two major problems which limit the use of solvent extraction in industrial applications are the efficient creation and control of mass transfer surface area. This surface area is merely the surface area of the substance from which a solvent is to be extracted. In practice, interfacial mass transfer surface area is usually created by a form of mechanical agitation. Generally, this mechanical mixing is used to create small droplets with high surface area per unit volume as well as convection past the droplets. This mixing requires the bulk movement of the continuous phase, thus decreasing the efficiency of the process. As the system requires an energy input into the bulk of each liquid phase, energy is inefficiently used in such systems. In addition, agitation may create emulsions in the mass transfer apparatus which prove to be hard to characterize and which may prove difficult to control during phase disengagement. Also, the formed droplets are difficult to coalesce and can result in a significant increase in residence time in the vessel. Furthermore, mechanical mixers can break down causing problems and delays.

Accordingly, a need in the art exists for a effective and efficient solvent extraction method and system. This method and system should not require high energy inputs as is necessary in prior art systems and should avoid the foregoing problems.

SUMMARY OF THE INVENTION

Accordingly, it is a primary object of the present invention to provide a method and system for solvent extraction which will provide sufficient surface area for mass transfer and simultaneous phase separation in counter current operations by the use of an electric field.

It is another object of the present invention to provide a method and system for solvent extraction which eliminates the need for mechanical agitation.

It is a further object of the present invention to provide a method and system which eliminates the problems of emulsions created by mechanical agitation.

It is yet another object of the present invention to provide a method and a system which is highly efficient and reliable.

It is a further objective of the present invention to provide counter current flow of two liquid phases.

It is also another object of the present invention to provide a method and a system for solvent extraction which is mechanically simple and compact.

These and other objects of the present invention are fulfilled by providing a method for solvent extraction between a dispersed phase and a continuous phase comprising the steps of forming original droplets of the dispersed phase each droplet having a first surface area, generating an electric field, and introducing the original droplets into the electric field, thus forming an emulsion of smaller droplets in the continuous phase of the system the smaller droplets produced from each of the original droplets having a combined total second surface area which is greater than the total surface area of the original droplet(s), coalescing the plurality of smaller droplets to reform larger droplets which reformed larger droplets are stable in the electric field, and disengaging or separating the reformed droplets from the continuous phase to form clear separate phase of disperses material from a clear separate phase of the continuous material.

This method for solvent extraction may be carried out by a system comprising, means for forming the first droplets, such droplet having a first surface area, means for generating an electric field, means for permitting the first droplets to pass through the electric field, and means for pulsing the electric field as the first droplet passes therethrough in order that said first droplet disintegrates into a plurality of smaller droplets, said smaller droplets having a combined total surface area which is greater than said surface area of the first droplet, coalescing a plurality of the smaller droplets to reform larger droplets which are stable in the electric field, and disengaging or separating the reformed droplets from the emulsion to form a separate phase of material distinct from the phase of the original droplets.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
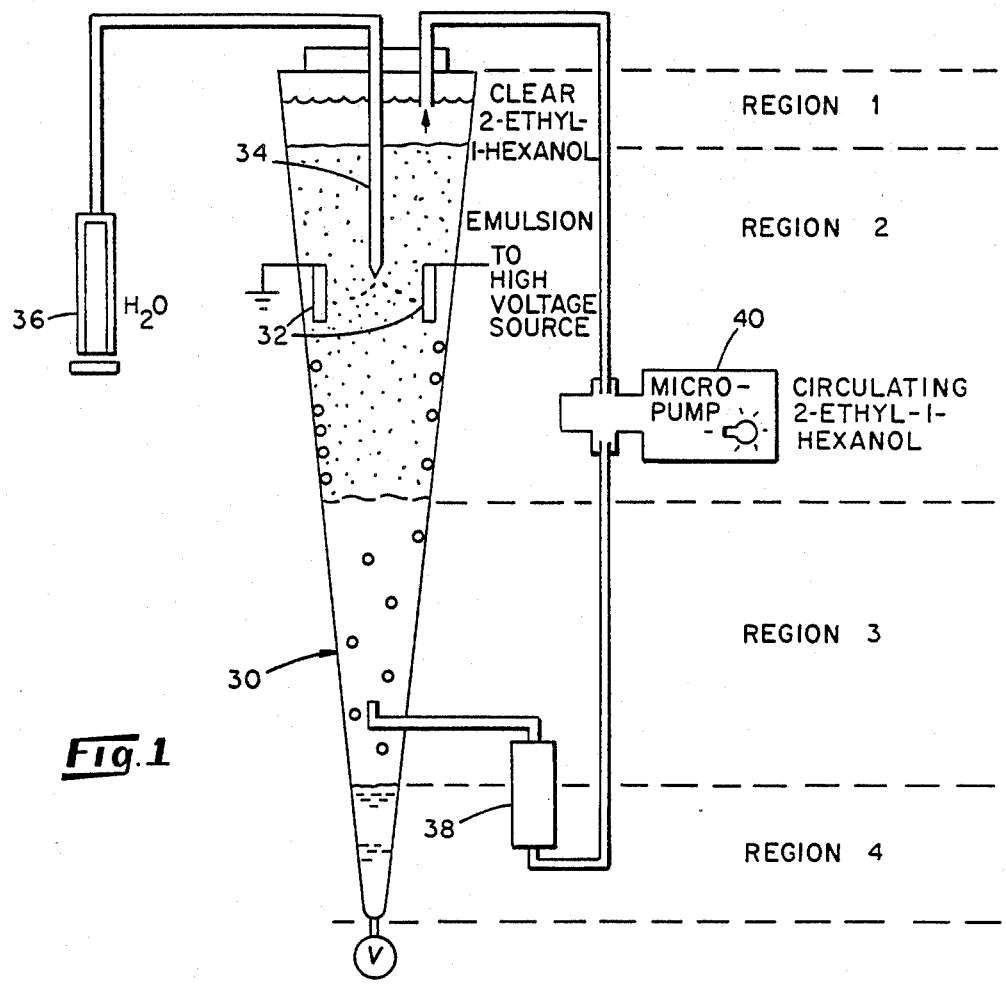
FIG. 1 is an example of a system for an electrically driven counter current solvent extraction process based upon the concept of variation of droplet stability as a function of the field strength of the electric fields, droplet size and electric field characteristics of the present invention.

Referring in detail to the drawings and with particular reference to FIG. 1, an apparatus is disclosed for electric field driven solvent extraction. This solvent extraction system uses electric fields to enchance mass transfer. This electric field first disperses and then coalesces a dispersed phase in the presence of a counter current flow of a continuous phase. This system consists of an organic liquid and an aqueous liquid. A column 30 is provided for containing the liquids. At the top of column 30, a region 1 is provided which contains clear organic continuous phase which continuously flows out of the column. In region 2, electrodes 32 are provided as well as a nozzle 34 for the inlet introduction of the droplets of the aqueous or dispersed phase. The aqueous phase flows through the nozzle placed between the electrodes and emerges as droplets which are emulsified as a result of droplet rupture by the high intensity pulsing electric field and do not recirculate. The emulsion phase circulates or descends between the electrodes. Coalescence occurs substantially simultaneously with emulsification at some point between the electrodes in region 2 as the droplets fall through the continuous phase of the system.

After the many small droplets have coalesced, the resulting reformed large droplets will fall through Region 3 to the bottom of column 30 and form an aqueous phase depicted as Region 4. As the column 30 is tapered, the smaller droplets will disengage from the organic liquid and a clear organic phase will form at the top of the column (region 1).

The aqueous phase which is introduced through nozzle 34 in droplet form passes through an electric field between electrodes 32 in region 2. This electric field is of sufficient strength to cause significant electrical stresses at the interface of the two phases, e.g. the dispered phase and. This continuous phase stress induced by the electric field as previously noted will cause the original droplets of the aqueous phase to form an emulsion comprised of numerous small droplets in the 1-50 micron range and thus to form a vast amount of interfacial mass transfer surface area. A portion of the emulsified droplets are coalesced to form larger droplets which are stable in the electric field. These reformed droplets fall through the upflowing organic continuous phase (region 3) to form a separate aqueous phase at the bottom of the vessel (region 4). Accordingly, complete dispersion, coalescence and phase separation in one vessel utilizing one electric field is accomplished. At steady-state, the flow of aqueous phase into the column 34 is equal to the accumulation of the coalesced aqueous phase received at the bottom of the vessel (region 4) and the amount of clear organic phase removed from region 1 is equal to that entering in region 3. Therefore, the possibility for realization of true counter current operations exists in this system. In FIG. 1, a pump 40 is shown for circulating the material. Also, a rotameter 38 is disclosed. The aqueous phase which flows through nozzle 34 is pumped from a syringe pump 36.

The electrodes may be operated with AC or DC pulsing electric fields. The flow rates of the aqueous (dispersed) phase and an organic (continuous) phase as well as the electric fields can be adjusted to vary the effect on the droplet size, coalescence and mass transfer.

Figure 2:
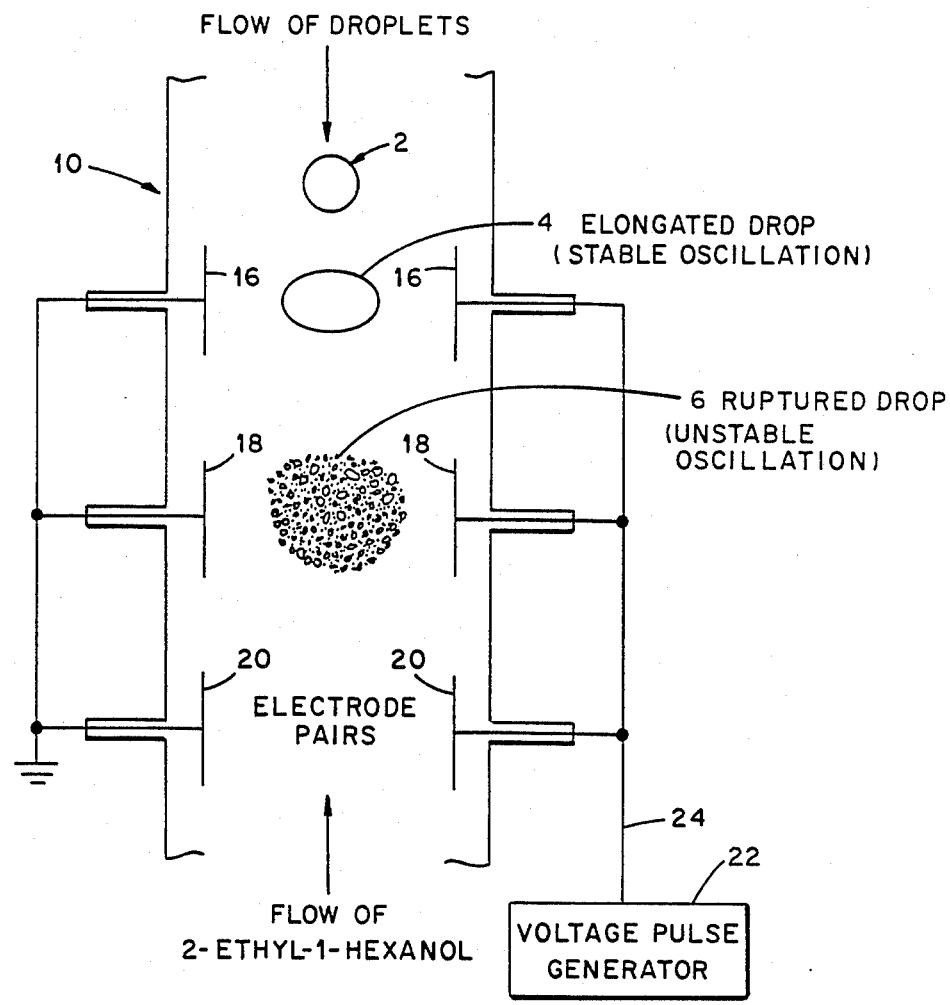
FIG. 2 is a cross-sectional view of portion of an apparatus for examining variance of droplet stability in pulsing electric fields involving the method of the present invention.

Referring now to FIG. 2, an apparatus is shown consisting of a channel 10 which may be in the form of a square glass channel, for example. A spherical, conducting first droplet 2 is placed in this channel. This droplet is surrounded by a nonconducting continuum. As this droplet moves downwardly in the channel 10, it will pass between various pairs of electrodes 16, 18 and 20. While only three electrodes are shown in FIG. 1, it is contemplated that fewer or additional electrodes may be used. These electrodes are connected to a voltage pulse generator 22 by a connection 24.

As the droplet 2 travels downwardly in channel 10, it passes through a high intensity pulsed electric field for example a field greater than 1 kV/cm. Stress is imposed upon this droplet causing it to elongate as indicated by numeral 4. These stresses may be large enough to cause the droplets to shatter into many daughter droplets 6 when the proper combination of electric field strength and pulsed frequency is utilized. These daughter droplets 6 increase the available surface area for mass transfer. Energy utilization in this process is extremely efficient because the electric field acts only at the droplet-continuum interface rather than throughout the bulk of the phases. The stability of a droplet, as stated above, is a function of field strength, droplet size, and pulse rate. This is the phenomenon which allows one to control the droplet size present in the system of the present invention.

Figure 3:
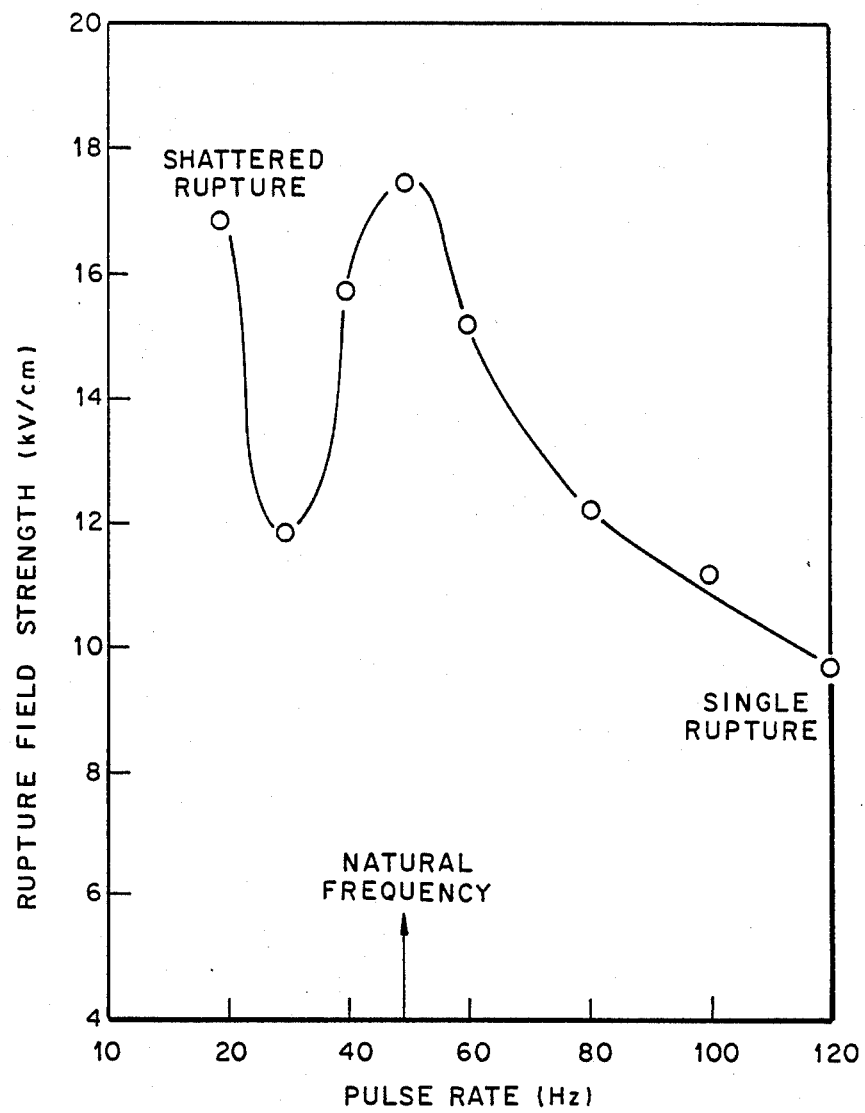
FIG. 3 is a graph showing a typical rupture behavior of 0.089-cm-radius water droplets in a 2-ethyl-1 hexanol medium.

FIG. 3 indicates a plot of the field strength required to disrupt a droplet as a function of pulse rate of the electric field for a given droplet size of 0.089 cm radius as determined in an apparatus similar to FIG. 2. In general, as the pulse frequency increases (above 60 Hz), the field strength required for droplet destruction decreases.

Near the natural oscillation frequency a significant field strength is required for droplet rupture; hence, this implies a condition of maximum stability for the droplet. However, in the vicinity of the natural oscillation frequency of the droplet, a significant decrease in field strength is required for rupture occur, as seen in FIG. 3. This implies that the region near the natural oscillation frequency of a droplet can be made relatively unstable by choosing the appropriate pulse frequency and field strength for the electric field. Curves similar to FIG. 3 exist for each droplet size so that for a given combination of electric field strength and pulse frequency, one droplet may undergo stable oscillations and remain relatively unaffected while another droplet of a different size is disintegrated into an emulsion of small droplets. This phenomenom allows one to control droplet size by choosing a field strength and a pulse frequency. All droplet sizes which are in the vicinity of their respective natural oscillation frequency should become unstable and rupture. Such ruptured droplets result in a plurality of smaller droplets with greater surface area. This greater surface area provides for improved solvent extraction.

The technique of the instant invention shown in FIG. 1 may be useful in a large number of different equipment configurations. This concept may be applied to the chemical processing industry. For instance, the placement of current separation processes with liquid-liquid solvent extraction systems may be modified by using the method and system of the present invention. This technology may also be applicable to nuclear fuel recycle operations. Also, the method and system of the present invention has analytical laboratory applications as well.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for solvent extraction comprising the steps of:
 introducing droplets of a dispersed phase to a counter-current flow of a continuous phase which droplets have a first surface area and are allowed to free-fall through said continuous phase;
 applying a constant high-intensity-pulsed electric field to said original droplets of said dispersed phase so as to shatter said droplets into many smaller droplets to form an emulsion of said smaller droplets in said continuous phase, said smaller droplets having a combined total surface area which is greater than a total surface area of said original droplets;
 substantially simultaneously coalescing a plurality of said smaller droplets to reform larger droplets, said larger droplets being stable in said electric field; and
 separating said reformed droplets from said emulsion to form a separate phase of said dispersed material.

2. The method of claim 1, wherein said pulsed electric field has a pulse rate of from 20–60 Hz.

3. The method of claim 1, wherein said pulsed electric field has a pulse rate of from 60–120 Hz.

4. The method of claim 1, wherein said dispersed phase comprises conducting droplets and said continuous phase is non-conducting.

5. The method of claim 1, wherein each droplet has a natural oscillation frequency and said pulsed frequency applied is in the vicinity of said natural oscillation frequency.

6. A system for solvent extraction comprising:
 a column for transporting a solvent extraction system including a dispersed phase and a continuous phase;
 means for introducing droplets of said dispersed phase, each of said droplets having a first surface area, to a counter-current of said continuous phase such that said droplets are allowed to free fall through said continuous phase;
 means for applying a constant high intensity-pulsed electric field to said droplets of said dispersed phase so as to shatter said droplets into many smaller droplets, said smaller droplets having a combined total surface area which is greater than a total surface area of said original droplets, which small droplets substantially simultaneously coalesce; and
 means for supporting said coalesced particles of said dispersed phase from said continuous phase.

7. The system according to claim 6, wherein said first droplet has a natural oscillating frequency and means are provided for adjusting the pulse frequency of said electric field in the vicinity of said natural oscillating frequency of said droplet.

8. The system according to claim 6, wherein a tapered column is provided through which the droplets travel as they pass through the electric field the tip portion of said tapered column being located at the bottom of said column.

* * * * *